(12) United States Patent
Kuntschke et al.

(10) Patent No.: US 10,251,153 B2
(45) Date of Patent: Apr. 2, 2019

(54) COMMUNICATION DEVICE AND METHOD FOR COMMUNICATION

(71) Applicant: Siemens Aktiengesellschaft, Munich (DE)

(72) Inventors: Richard Kuntschke, Geisenhausen (DE); Andreas Scholz, Unterschleissheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 63 days.

(21) Appl. No.: 14/910,069

(22) PCT Filed: Aug. 19, 2014

(86) PCT No.: PCT/EP2014/067609
§ 371 (c)(1),
(2) Date: Feb. 4, 2016

(87) PCT Pub. No.: WO2015/043834
PCT Pub. Date: Apr. 2, 2015

(65) Prior Publication Data
US 2016/0198435 A1    Jul. 7, 2016

(30) Foreign Application Priority Data
Sep. 27, 2013    (DE) .......... 10 2013 219 543

(51) Int. Cl.
*H04W 72/00*    (2009.01)
*H04L 29/12*    (2006.01)
(Continued)

(52) U.S. Cl.
CPC ........ *H04W 72/005* (2013.01); *G06Q 20/322* (2013.01); *H04L 61/2038* (2013.01);
(Continued)

(58) Field of Classification Search
None
See application file for complete search history.

(56) References Cited

U.S. PATENT DOCUMENTS

| 6,178,414 | B1 * | 1/2001 | Beckmann ........ G06F 17/30958 |
| 2001/0036169 | A1 * | 11/2001 | Ratzel .............. H04L 1/18 370/338 |

(Continued)

FOREIGN PATENT DOCUMENTS

| CN | 101491058 A | 7/2009 | ............. H04L 29/06 |
| EP | 1750464 A1 | 2/2007 | ............. H04W 88/06 |
| WO | 2015/043834 A1 | 4/2015 | ............. H04L 29/12 |

OTHER PUBLICATIONS

Orava, Pekko et al., "Temporary MAC Addresses for Anonymity," IEEE P802.11 Wireless LANs, pp. 1-5, Mar. 14, 2002.
(Continued)

*Primary Examiner* — Bunjob Jaroenchonwanit
(74) *Attorney, Agent, or Firm* — Slayden Grubert Beard PLLC

(57) ABSTRACT

A communication device includes a transceiver unit for receiving from a central installation a broadcast message containing information for initiating communication between the communication device and the central installation, and a control unit for selecting a hardware address for the communication device in response to the information contained in the broadcast message. The selected hardware address can be used for addressing the communication device for messages from the central installation. The transceiver unit is designed to communicate with the central installation using the selected hardware address for the duration of a session. The control unit is designed to delete the selected hardware address after the duration of the session has expired. Selecting a hardware address randomly and deleting the hardware address after the session has
(Continued)

expired allows communication between the communication device and the central installation, while maintaining the identity of the communication device anonymous.

16 Claims, 3 Drawing Sheets

(51) Int. Cl.
*G06Q 20/32* (2012.01)
*H04L 29/06* (2006.01)

(52) U.S. Cl.
CPC ...... *H04L 61/6022* (2013.01); *H04L 61/2092* (2013.01); *H04L 63/0414* (2013.01)

(56) References Cited

U.S. PATENT DOCUMENTS

| | | | | |
|---|---|---|---|---|
| 2002/0129133 | A1* | 9/2002 | Olsen | H04L 12/1881 709/223 |
| 2003/0097470 | A1* | 5/2003 | Lapuh | H04L 45/245 709/239 |
| 2006/0092860 | A1* | 5/2006 | Higashitaniguchi | H04L 41/12 370/255 |
| 2007/0019609 | A1 | 1/2007 | Anjum | 370/349 |
| 2008/0019319 | A1* | 1/2008 | Bahini | H04L 29/12018 370/331 |
| 2008/0250492 | A1* | 10/2008 | Hazard | H04L 63/0272 726/15 |
| 2010/0135293 | A1* | 6/2010 | Donaghey | H04L 12/66 370/389 |
| 2013/0016715 | A1* | 1/2013 | Schulzrinne | H04L 29/08576 370/352 |
| 2013/0210461 | A1* | 8/2013 | Moldavsky | G06Q 30/0261 455/456.3 |
| 2014/0003344 | A1* | 1/2014 | Kim | H04L 47/34 370/328 |
| 2014/0036728 | A1* | 2/2014 | An | H04W 40/02 370/254 |
| 2014/0040440 | A1* | 2/2014 | Christopher | H04L 61/6022 709/220 |
| 2014/0040558 | A1* | 2/2014 | Ajima | G06F 15/173 711/130 |
| 2014/0098745 | A1* | 4/2014 | Balasubramanian | H04W 72/005 370/328 |
| 2014/0358866 | A1* | 12/2014 | Gholmieh | G06F 17/30371 707/691 |
| 2015/0296278 | A1* | 10/2015 | Liu | H04J 14/0267 398/50 |
| 2015/0365421 | A1* | 12/2015 | Warrick | H04L 61/103 726/4 |
| 2015/0372917 | A1* | 12/2015 | Biswas | H04L 45/64 370/392 |
| 2016/0036687 | A1* | 2/2016 | Brown | H04W 88/16 370/401 |
| 2016/0198435 | A1* | 7/2016 | Kuntschke | H04L 61/2038 370/329 |
| 2017/0141985 | A1* | 5/2017 | Haggar | H04L 43/0876 |
| 2017/0214549 | A1* | 7/2017 | Yoshino | H04L 12/4641 |
| 2017/0214602 | A1* | 7/2017 | Alshinnawi | H04L 61/6022 |

OTHER PUBLICATIONS

International Search Report and Written Opinion, Application No. PCT/EP2014/067609, 19 pages, dated Nov. 27, 2014.

* cited by examiner

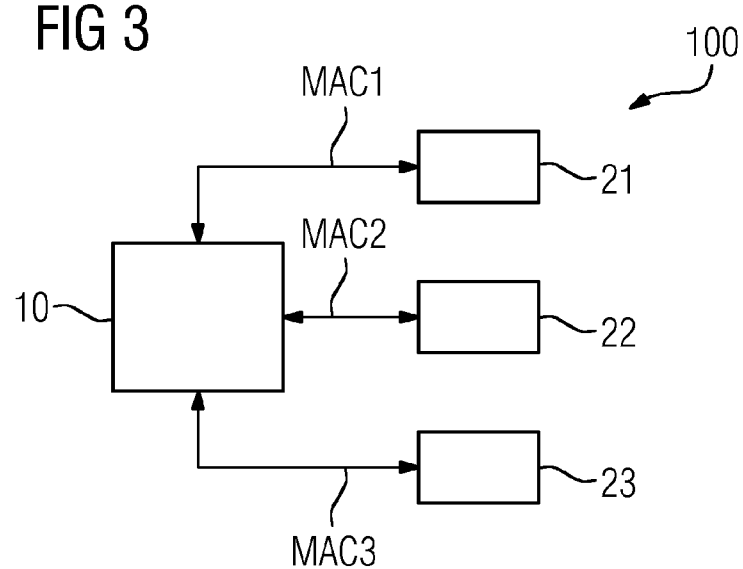
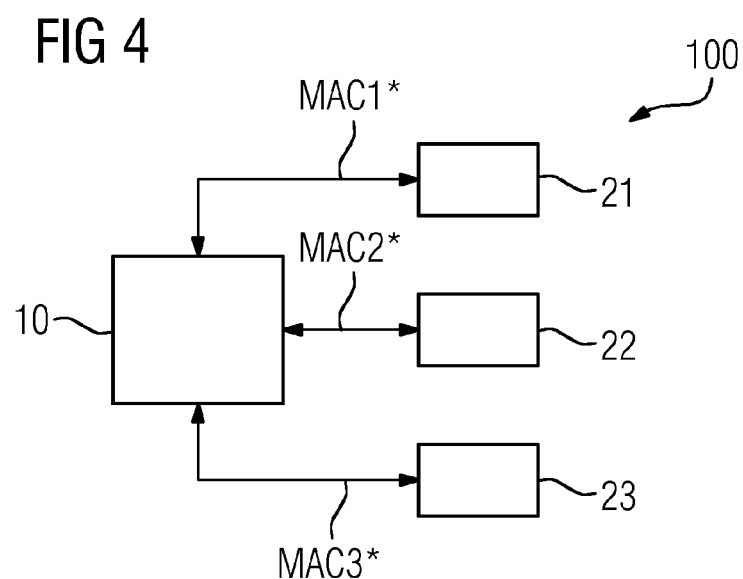

COMMUNICATION DEVICE AND METHOD FOR COMMUNICATION

CROSS-REFERENCE TO RELATED APPLICATIONS

This application is a U.S. National Stage Application of International Application No. PCT/EP2014/067609 filed Aug. 19, 2014, which designates the United States of America, and claims priority to DE Application No. 10 2013 219 543.5 filed Sep. 27, 2013, the contents of which are hereby incorporated by reference in their entirety.

TECHNICAL FIELD

The present invention relates to a communication device and to a communication system having a multiplicity of such communication devices. The invention also relates to a method for communication between a communication device and a central installation in a communication system.

BACKGROUND

In various technical fields, a communication takes place between a central installation such as a central server, and various other communication devices. In this context, the communication devices must identify themselves to the central installation in order to be able to be addressed during the further communication, i.e. to be able to receive messages intended for it. For this purpose, MAC addresses are frequently used which are defined for each communication device. MAC addresses can be unambiguously allocated to the devices. Due to this unambiguous allocatability, it is possible to determine and detect each individual communication device, for example as part of a wireless communication network.

Wireless communication can thus offer advantages with respect to automation/detection systems. For example, it is possible to detect persons or objects via communication devices connected to them and to communicate with these without having to set up terminals or similar devices. This can be advantageous with respect to throughput and comfort.

One possible example of an application is a wireless electronic ticket system for the public short-distance passenger service. In a wireless electronic ticket system, individual trips by users then no longer have to be paid by printed tickets or other types of charge cards, for example when passing through a turnstile. Instead, an intelligent charge card with radio interface can be provided for each customer, which can communicate with the means of transportation, for example via a central communication server. In this way, it is possible to document which means of transportation have been used when by a customer. The accounting can take place in various ways, based on this data, for example similarly to a telephone bill retroactively for the past month and could even contain a verification of a single connection.

When such a wireless interface is used, there is the risk, however, that the communication between the charge card and the means of transportation or the central communication server, respectively, can be monitored. If no suitable measures are taken such as, e.g. encryption of the data transmitted, it is possible, therefore, to identify individual customers or the communication devices allocated to them, respectively, unambiguously due to the monitored data and, in consequence, also to follow their movement. This is also called tracking.

To secure the transmission of data or hinder monitoring or tapping into the data, encryption methods such as SSL can be used, for example, which may ensure that only the desired receiver can decrypt the data. The transmitted data per se can thus be secured.

However, for transferring the data in the network addresses are used, particularly MAC addresses, which allow the individual communication partner to be addressed within the network. Usually, fixed MAC addresses are issued by the manufacturer in networks, as also the internet, for network cards. On the one hand, this can assure that addresses are unambiguous within the networks.

On the other hand, such fixed MAC addresses are already sufficient for enabling users to be tracked since the MAC addresses are unambiguous for each communication device or the network cards contained in these devices and can be easily monitored.

To prevent tracking of communication devices, and thus their users, anonymization on the level of addressing would be desirable additionally apart from encryption at the level of the data.

In a method for generating anonymous MAC addresses, a network subscriber, i.e. a communication device in the network, generates a random MAC address and reports it to a central node or access point. The central node checks this address for unambiguousness. In the case of doubly selected addresses, the network subscriber must generate a new address and start the process again. If the address is unambiguous, the network subscriber is allowed to communicate by using the generated address.

In another embodiment, a central node generates anonymous MAC addresses and distributes these to network subscribers. In comparison with the method mentioned above, this method has the advantage that doubled allocation of addresses can be prevented directly on generation of the address.

Alternatively, a network subscriber can generate a random MAC address by means of a complex connection of a random number to a secret fixed MAC address. This makes it possible to achieve, even with restrictions, that the address generated is random enough for ensuring anonymity and the probability of collisions is so small that no central allocation of the MAC address is required.

SUMMARY

One embodiment provides a communication device which can be connected via an interface to a central installation in a communication system. The communication device comprises a transceiver unit for receiving a broadcast message from the central installation, the broadcast message having information for initiating a communication between the communication device and the central installation, and a control unit for selecting a hardware address for the communication device in response to the information contained in the broadcast message, wherein the selected hardware address can be used for addressing the communication device for messages from the central installation. The transceiver unit is designed for communicating with the central installation by using the selected hardware address during the period of a session, and the control unit is designed to delete the selected hardware address after the period of the session has expired.

In a further embodiment, the broadcast message has information which specifies characteristics of the hardware address.

In a further embodiment, the characteristics predetermine a possible range of values of the hardware address and/or in that the characteristics have a validity period of the hardware address.

In a further embodiment, the control unit is designed to select a hardware address for the communication device randomly or pseudo-randomly in response to the information contained in the broadcast message.

In a further embodiment, the control unit is designed to select the hardware address on the basis of the information in the broadcast message.

In a further embodiment, the control unit is designed to generate the hardware address on the basis of the information in the broadcast message.

In a further embodiment, the communication device includes a storage unit in which a plurality of hardware addresses is stored, the control unit being designed to select one hardware address from the stored plurality of hardware addresses.

In a further embodiment, the broadcast message has information which specifies a duration of the session.

In a further embodiment, the duration of the session is defined by a period of time and/or a number of transmitted and/or received messages.

In a further embodiment, the transceiver unit is designed to send user-specific data to the central installation.

Another embodiment provides a communication system comprising a central installation and a number of communication devices as disclosed above.

In a further embodiment, the communication system is a wireless telecommunication network.

In a further embodiment, the communication system has a limited range.

In a further embodiment, the communication system has a payment system, wherein the central installation is designed to perform payment processes with the communication devices.

Another embodiment provides a method for communication between a communication device and a central installation in a communication system which can be connected to one another via an interface. The method includes receiving a broadcast message from the central installation, the broadcast message having information for initiating a communication between the communication device and the central installation; selecting a hardware address for the communication device in response to the information contained in the broadcast message, wherein the selected hardware address can be used for addressing the communication device for messages from the central installation; communicating between the communication device and the central installation by using the selected hardware address during the period of a session; and deleting the selected hardware address after the period of the session has expired.

BRIEF DESCRIPTION OF THE DRAWINGS

Example embodiments of the invention are explained in greater detail below with reference to the figures, in which:

FIGS. 2 to 4 show example embodiments of a communication system in various communication steps.

DETAILED DESCRIPTION

Figure 1:
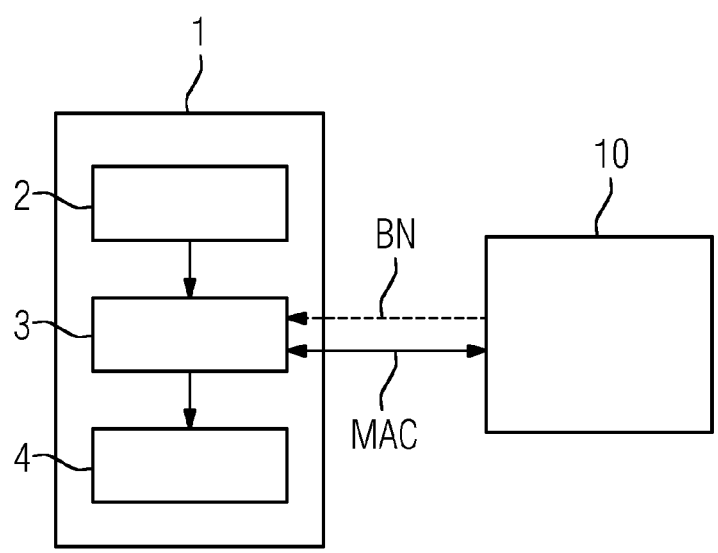
FIG. 1 shows a communication device according to one embodiment.

Embodiments of the present invention provide reliable and simple communication of network devices with a central communication server.

Accordingly, a communication device is proposed which can be connected via an interface to a central installation in a communication system. The communication device has a transceiver unit for receiving a broadcast message from the central installation, the broadcast message having information for initiating a communication between the communication device and the central installation, and a control unit for selecting a hardware address for the communication device in response to the information contained in the broadcast message, wherein the selected hardware address can be used for addressing the communication device for messages from the central installation. The transceiver unit is designed for communicating with the central installation by using the selected hardware address during the period of a session. The control unit is designed to delete the selected hardware address after the period of the session has expired.

In contrast to known methods, the communication device may perform a simple selection of a hardware address in which no complex computing processes or advance communication with the central installation are necessary. At the same time, however, the selection of the hardware address which does not correspond to the physical MAC address specified by the manufacturer, may provide or guarantee anonymity of the communication device within the network. In this manner, tracking of a user by means of its communication device can be prevented.

The communication device described is based on the following normal sequence within electronic detection systems such as, e.g., a ticket system in the public short-distance passenger services.

Firstly, the central installation such as, for example, a central communication server in a means of transportation sends a broadcast message to all communication devices such as, for example, charge cards, with the request to report at the means of transportation, i.e. the central installation. Such a broadcast message can contain various data such as the vehicle number, the stop or the like. The individual cards or communication devices then send their customer number or similar data to the means of transportation. The transmission of the data can be encrypted in order to secure these data.

Sending the broadcast message is uncomplicated from the point of view of addressing. The broadcast message is sent to all communication devices within reach of the central installation and does not contain any card- or communication device-specific address. Thus, monitoring the broadcast message does not allow individual cards to be tracked.

Sending data from the communication devices to the central installation can comprise sending a number of packets to and fro in the network depending on requirements and the protocols used. An SSL handshake, for example, comprises a number of packets. Since this communication is a point-to-point connection between the respective communication device and the central installation, it is necessary to use a device-specific address in order to provide for this communication.

However, for some applications such as, for example, payment systems, it is only necessary to maintain the communication for a limited time. This hardware address is therefore needed only for a very short time, namely only for the period until the customer-specific data has been sent to the central installation.

The sequence of exchanged messages for conveying the customer-specific data represents a session. Communication in such a system, e.g. a ticket system, only requires that communication devices such as, for example, cards, can be addressed during the session. After the conclusion of such a session, it is no longer necessary still to be able to address communication devices. If communication devices are to be acquired another time at a later time, the complete process is restarted beginning with the broadcast.

According to the communication device described, a session hardware address is thus generated. This means that a hardware or MAC address is generated which provides for unambiguous addressing of communication devices for the period of the session which, however, can be selected randomly for each session and thus provides for anonymous utilization.

To prevent attacks on the data traffic or to recognize these, suitable encryption methods can be used at session level which, for example, ensure that forged packets can be detected and discarded. If there should be hardware addresses issued or selected doubly and thus used doubly, this would represent an attack from the point of view of application. This means that data packets are received by nodes with which it is actually not intended to communicate. These packets can be detected and discarded by such encryption methods.

To avoid non-availability of a communication device due to such discarding of data packets, various methods are possible. For example, a broadcast message can be sent doubly or more frequently so that a communication device would generate a new hardware address in the case of a first failed attempt. There is little probability that a collision, and such a discarding of data, occur more frequently following one another for the same communication device.

According to one embodiment, the broadcast message has information which specifies characteristics of the hardware address.

Accordingly, the broadcast message can contain information which contains an indication of how the hardware address is selected by the control unit. Although the selection of the hardware addresses can still be random in this manner, it is restricted with respect to the communication to be performed. The central installation can thus specify the random selection of the hardware address by means of framework conditions.

According to a further embodiment, the characteristics predetermine a possible range of values of the hardware address.

Specifying a range of values of the hardware address makes it possible to ensure that the probability of collisions, that is to say hardware addresses issued doubly within the communication system, is reduced. Thus, depending on the size of the communication system and the associated number of communication devices within the communication system, the possible range of values of the hardware addresses can be enlarged or reduced, for example. In the case of a relatively large quantity of communication devices, the range of values should be greater than with a relatively small quantity of communication devices.

According to a further embodiment, the characteristics specify a validity period of the hardware address.

Thus, for example, it is possible to specify in the broadcast message that a hardware address has only a maximum period of validity. The validity period of the hardware address can differ from the period of a session.

According to a further embodiment, the control unit is designed to select a hardware address for the communication device randomly or pseudo-randomly in response to the information contained in the broadcast message.

Thus, for example, the control unit can use an algorithm for selecting a hardware address pseudo-randomly.

According to a further embodiment, the control unit is designed to select the hardware address on the basis of the information in the broadcast message.

According to this embodiment, the control unit is designed to take into consideration the information which is contained in the broadcast message when it selects the hardware address. In this manner, specifications which are conveyed by the central installation in the broadcast message to the communication device can be taken into consideration during the selection of the hardware address.

According to a further embodiment, the control unit is designed to generate the hardware address on the basis of the information in the broadcast message.

According to this embodiment, the control unit is designed not only to select a hardware address but also to generate it. In this context, the control unit can take into consideration the information in order to generate the hardware address according to the specifications which are contained in the information in the broadcast message.

According to a further embodiment, the communication device has a storage unit in which a plurality of hardware addresses is stored, the control unit being designed to select one hardware address from the stored plurality of hardware addresses.

The control unit can generate, for example, a plurality of hardware addresses on the basis of the information in the broadcast message and store these in the storage unit. In a further step, the control unit can then select one hardware address from the stored plurality of hardware addresses. Alternatively, a plurality of hardware addresses can be stored in the storage unit already by the manufacturer, the control unit then being able to select a suitable hardware address from the stored plurality of hardware addresses on the basis of the received broadcast message. The selected hardware address can be deleted completely from the storage unit after the period of the session has expired, or marked as already used. Alternatively, the hardware address can also remain in the storage unit for repeated selection.

According to a further embodiment, the broadcast message has information which specifies a duration of the session.

A duration of the session can thus be specified by the central installation. The duration of the session can also be used for the validity period of the hardware address. Alternatively, the duration of the session can also differ from the validity period of the hardware address if the broadcast message has other information which specifies the validity period of the hardware address.

According to a further embodiment, the duration of the session is defined by a period of time and/or a number of transmitted and/or received messages.

The duration of the session can thus be determined either by a time measurement, or it is possible to count the number of messages sent and received, which then determine the duration of the session. For example, it is possible to specify that the duration of the session is determined in such a manner that there is sufficient time, or a sufficient number of messages can be sent in order to send the necessary user data from the communication device to the central installation.

According to a further embodiment, the transceiver unit is designed to send user-specific data to the central installation.

Since user-specific data such as customer data or other information usually only need a short time for being transmitted, a duration of a session can be short. For example, if the communication system is a ticket system, the user-specific data can relate to payment processes and have, for example, customer data.

According to a further embodiment, a communication system comprising a central installation and a number of communication devices as have been described above is proposed.

The number of communication devices can be only one communication device or also a number of communication devices.

According to one embodiment, the communication system can be a wireless telecommunication network.

For example, the communication system can be a WLAN network. Another possibility of a wireless telecommunication network is a pure telecommunication network which operates by mobile radio. Other types of wireless networks and communication options such as RFID are also possible.

According to a further embodiment, the communication system has a limited range.

According to this embodiment, the communication system is only available within a limited spatial area. This restricts the probability of collisions between various communication devices by selection of the hardware addresses since only a limited number of communication devices are within the range of the communication system or of the central installation respectively.

According to a further embodiment, the communication system has a payment system, wherein the central installation is designed to perform payment processes with the communication devices.

For example, the communication system can be a ticket system for the public short-distance passenger services or at entrances to public installations. In this context, the communication devices can send customer specific data to the central installation via the communication system in order to perform payment processes.

According to a further aspect, a method for communication between a communication device and a central installation in a communication system, which can be connected to one another via an interface, is proposed. The method has the following steps: receiving a broadcast message from the central installation, the broadcast message having information for initiating a communication between the communication device and the central installation, randomly selecting a hardware address for the communication device in response to the broadcast message, wherein the selected hardware address can be used for addressing the communication device for messages from the central installation, communicating between the communication device and the central installation by using the selected hardware address during the period of a session and deleting the selected hardware address after the period of the session has expired.

Furthermore, a computer program product is proposed which causes the method as explained above to be performed on a program-controlled installation.

A computer program product such as, e.g., a computer program means can be provided or delivered, for example, as storage medium such as, e.g., memory card, USB stick, CD ROM, DVD, or also in the form of a downloadable file by a server in a network. This can take place, for example, in a wireless communication network by the transmission of a corresponding file with the computer program product or the computer program means.

The embodiments and features described for the proposed device apply correspondingly to the method proposed.

Other possible implementations of the invention also comprise combinations, not mentioned explicitly, of features or embodiments described before or in the text which follows with respect to the exemplary embodiments. In this context, the expert will also add individual aspects as improvements or supplements to the respective basic form of the invention.

FIG. 1 shows an embodiment of a communication device 1 which communicates with a central installation 10. This central installation 10 sends a broadcast message BN to the communication device 1 and other communication devices which are resident in the communication system. This is shown in FIGS. 2-4.

The communication device 1 has a transceiver unit 3 which receives the broadcast message BN. On the basis of information which is contained in the broadcast message BN, a control unit 2 of the communication device 1 selects a hardware address MAC. The transceiver unit 3 uses this hardware address MAC for communicating with the central installation 10. The control unit 2 can select the hardware address MAC, for example, from a plurality of hardware addresses MAC which are stored in a storage unit 4 of the communication device 1. The control unit 2 may include a processor or any other device appropriate to perform these functions.

After a session has expired which is determined, for example, by a number of messages to be transmitted, the hardware address MAC used is deleted. For a new communication between the communication device 1 and the central installation 10 after reception of a broadcast message BN, a new hardware address MAC must be selected or generated.

Figure 2:
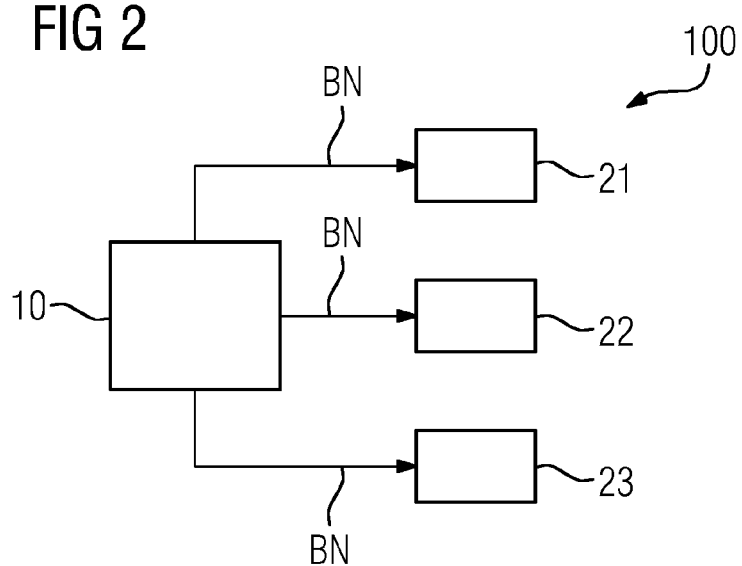

FIG. 2 shows a communication system 100 which has a plurality of communication devices 21-23. The configuration of the individual communication devices 21-23 is identical to the configuration of the communication device 1 from FIG. 1.

Firstly, a central installation 10 sends a broadcast message BN to all communication devices 21-23 which are present in the communication system and, therefore, can be reached. After receiving the broadcast message BN, each of the communication devices 21-23 can select its own hardware address.

As is shown in FIG. 3, each communication device 21-23 selects its own hardware address which differ from one another. Thus, the communication device 21 communicates with the central installation 10 by using the hardware address MAC1, the communication device 22 by using the hardware address MAC2 and the communication device 23 by using the hardware address MAC3. By means of the various hardware addresses MAC1-MAC3, each communication device 21-23 can be identified and addressed unambiguously within the communication system 100. Since a new hardware address is selected every time for a session, communication within the communication network 100 is anonymous. Each hardware address MAC1-MAC3 does not contain any data which allow a real hardware address of the communication devices 21-23 to be inferred.

After a session has ended, the hardware addresses MAC1-MAC3 are deleted. For a new session and new transmission of data, the central installation 10 again sends a broadcast message BN to the communication devices 21-23 as is shown in FIG. 2. Following this, each communication device 21-23 selects a new hardware address MAC1*-MAC3* as is shown in FIG. 4. These new selected or generated hardware addresses MAC1*-MAC3* can again be used until the session has expired and the hardware addresses MAC1*-MAC3* are correspondingly deleted.

Figure 5:
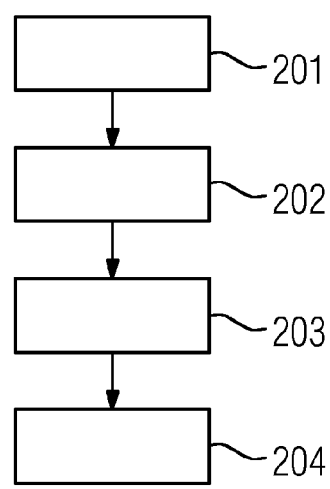
FIG. 5 shows an example method for communication between a communication device and a central installation, according to one embodiment.

FIG. 5 shows a method for communication between a communication device 1 as is shown in FIG. 1, and a central installation 10 as is shown in FIGS. 1-4. In a first step 201, the communication device 1 receives a broadcast message BN from the central installation 10. As already explained, the broadcast message BN has information for initiating a communication between the communication device 1 and the central installation 10.

In a second step 202, a hardware address MAC for the communication device 1 is randomly selected in response to the broadcast message BN. The selected hardware address MAC is used for addressing the communication device within the communication system 100.

In a third step 203, the communication device 1 and the central installation 10 communicate by using the selected hardware address MAC. This is possible during the period of a session.

In a fourth step 204, the selected hardware address MAC is deleted after the period of the session has expired. Subsequently, the method can recommence with the first step 201.

Although the present invention has been described by means of exemplary embodiments, it can be modified in many ways.

What is claimed is:

1. A communication device configured for connection via an interface to a central installation in a communication system, the communication device comprising:
   a transceiver unit configured to receive a broadcast message from the central installation, the broadcast message including information for initiating a communication between the communication device and the central installation,
   a storage unit that stores a plurality of hardware addresses, and
   a processor configured to select a hardware address from the plurality of the hardware addresses for use by the communication device, the selection depending at least in part on the information contained in the broadcast message, wherein the selected hardware address is usable for addressing the communication device for messages from the central installation,
   wherein the transceiver unit communicates with the central installation using the selected hardware address during a session.

2. The communication device of claim 1, wherein the processor is configured to react to information contained in the broadcast message including information corresponding to required characteristics of the selected hardware address.

3. The communication device of claim 2, wherein the processor is configured to react to the required characteristics including at least one of (a) a range of acceptable values of the hardware address, or (b) a required validity period of the hardware address.

4. The communication device of claim 2, wherein the processor selects the hardware address based on the information in the broadcast message.

5. The communication device of claim 1, wherein the processor generates the hardware address based on the information in the broadcast message.

6. The communication device of claim 1, wherein the processor randomly selects one hardware address from the stored plurality of hardware addresses.

7. The communication device of claim 1, wherein the selected hardware address corresponds to information in the broadcast message including a requested duration of the session.

8. The communication device of claim 7, wherein the selected hardware address corresponds to information in the broadcast message specifying a requested duration of the session defining at least one of (a) a period of time or (b) a number of communicated messages.

9. The communication device of claim 1, wherein the transceiver unit is configured to send user-specific data to the central installation.

10. The communication device of claim 1, wherein the processor adjusts a range of values for the plurality of hardware address based at least in part on a size of the communication system and a number of network devices connected to the communication system.

11. A communication system comprising:
    a central installation; and
    a plurality of communication devices, each communication device comprising:
    a transceiver unit configured to receive a broadcast message from the central installation, the broadcast message including information for initiating a communication between the communication device and the central installation,
    a storage unit storing a plurality of hardware address, and
    a processor configured to select a hardware address from the plurality of hardware addresses for the communication device, the selection depending at least in part on the information contained in the broadcast message, wherein the selected hardware address is usable for addressing the communication device for messages from the central installation,
    wherein the transceiver unit communicates with the central installation using the selected hardware address during a session.

12. The communication system of claim 11, wherein the communication system is a wireless telecommunication network.

13. The communication system of claim 11, further comprising a payment system configured to perform payment processes with the communication devices.

14. The communication system of claim 11, wherein the processor adjusts a range of values for the plurality of hardware address based at least in part on a size of the communication system and a number of network devices connected to the communication system.

15. A method for communication between a communication device and a central installation in a communication system configured for connection to one another via an interface, the method comprising:
    storing a plurality of hardware addresses in a storage unit of the communication device,
    receiving a broadcast message from the central installation, the broadcast message including information for initiating a communication between the communication device and the central installation,
    selecting a hardware address from the plurality of hardware addresses for use by the communication device, the selection depending at least in part on the information contained in the broadcast message, wherein the selected hardware address is usable for addressing the communication device for messages from the central installation, communicating between the communication device and the central installation by using the selected hardware address during the period of a session.

16. The method of claim 15, further comprising adjusting a range of values for the plurality of hardware address based at least in part on a size of the communication system and a number of network devices connected to the communication system.

* * * * *